(12) United States Patent
Carson

(10) Patent No.: US 11,392,408 B1
(45) Date of Patent: *Jul. 19, 2022

(54) SYSTEM AND METHOD FOR ASSIGNING TASKS TO COMPUTER SYSTEM ELEMENTS

(71) Applicant: Yellowbrick Data, Inc., Palo Alto, CA (US)

(72) Inventor: Neil Carson, Palo Alto, CA (US)

(73) Assignee: Yellowbrick Data, Inc., Mountain View, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 16/882,730

(22) Filed: May 25, 2020

Related U.S. Application Data

(63) Continuation of application No. 15/945,562, filed on Apr. 4, 2018, now Pat. No. 10,664,307.

(60) Provisional application No. 62/481,479, filed on Apr. 4, 2017.

(51) Int. Cl.
  *G06F 9/46* (2006.01)
  *G06F 9/48* (2006.01)

(52) U.S. Cl.
  CPC .......... *G06F 9/4831* (2013.01); *G06F 9/4881* (2013.01)

(58) Field of Classification Search
  CPC .................................................. G06F 9/4881
  USPC ....................................................... 718/103
  See application file for complete search history.

(56) References Cited

U.S. PATENT DOCUMENTS

| | | | | |
|---|---|---|---|---|
| 2010/0174581 | A1* | 7/2010 | Mochizuki | G06Q 10/06 705/7.15 |
| 2011/0208556 | A1* | 8/2011 | Nagahara | G06Q 10/06 705/7.14 |
| 2012/0096468 | A1* | 4/2012 | Chakravorty | G06F 9/50 718/103 |
| 2013/0111488 | A1* | 5/2013 | Gatti | G06N 20/10 718/103 |
| 2015/0135183 | A1* | 5/2015 | Kipp | G06F 9/4881 718/103 |
| 2015/0179166 | A1* | 6/2015 | Nagao | G10L 15/08 704/221 |
| 2015/0206091 | A1* | 7/2015 | Omiya | G06Q 10/063112 705/7.14 |
| 2015/0254596 | A1* | 9/2015 | Nayar | H04N 19/146 705/7.14 |
| 2015/0262111 | A1* | 9/2015 | Yu | G06Q 50/01 705/7.17 |
| 2017/0199757 | A1* | 7/2017 | Fountain | G06Q 10/00 |
| 2017/0353371 | A1* | 12/2017 | Wu | H04L 67/02 |
| 2019/0147092 | A1* | 5/2019 | Pal | H04L 67/1097 707/713 |
| 2019/0266026 | A1* | 8/2019 | Halim | G06F 9/4825 |
| 2019/0272271 | A1* | 9/2019 | Bhattacharjee | G06F 16/24554 |

\* cited by examiner

*Primary Examiner* — Mehran Kamran
(74) *Attorney, Agent, or Firm* — Innovation Partners LLC; Charles E. Gotlieb

(57) ABSTRACT

A system and method distributes work to workers using a timetable containing priority lists of requests to be performed by one worker or multiple workers.

18 Claims, 6 Drawing Sheets

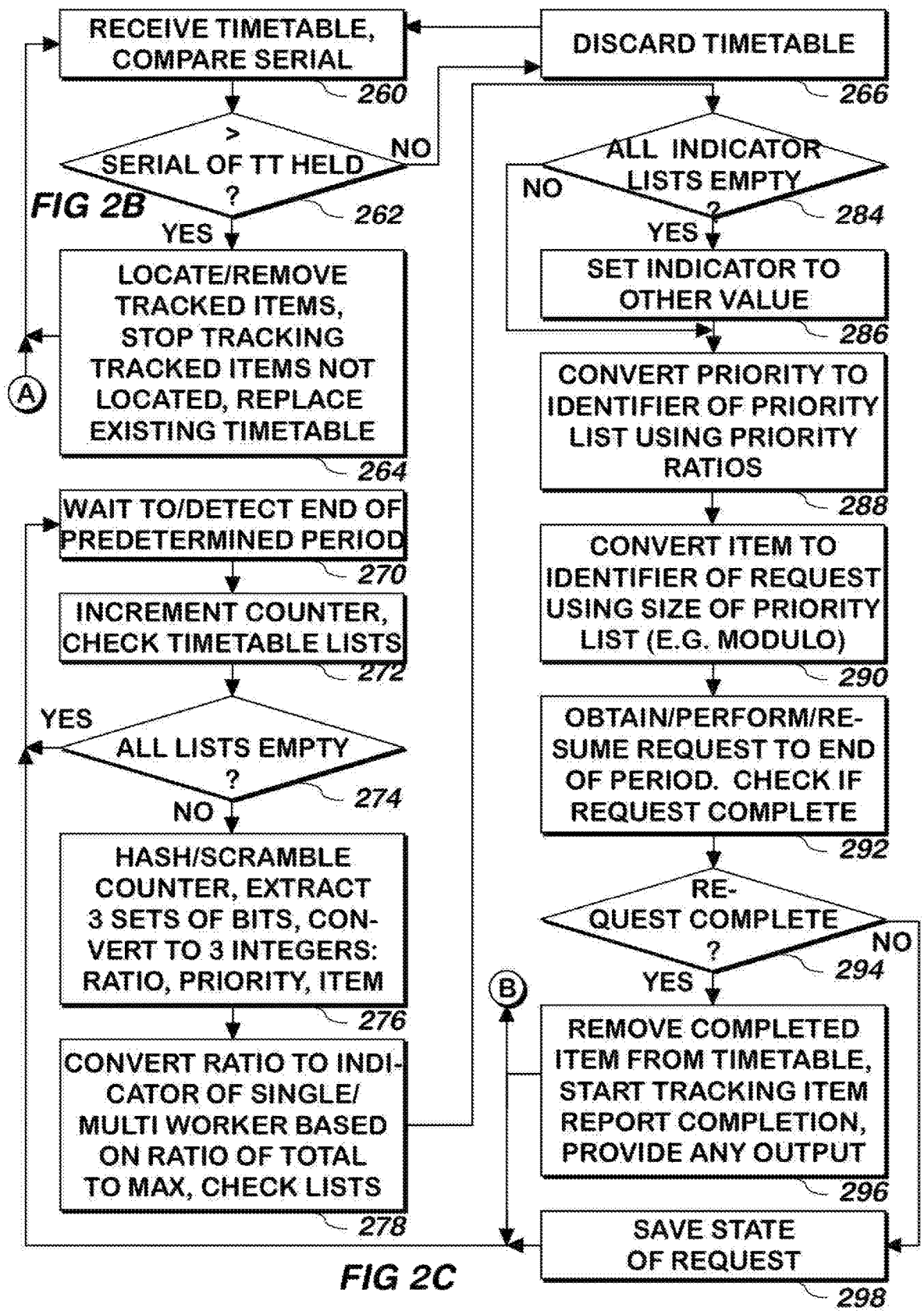

SYSTEM AND METHOD FOR ASSIGNING TASKS TO COMPUTER SYSTEM ELEMENTS

RELATED APPLICATIONS

This application is a continuation of, U.S. patent application Ser. No. 15/945,562 entitled, "System and Method for Assigning Tasks to Computer System Elements" filed by Neil Carson on Apr. 4, 2018, which claims the benefit of, U.S. Provisional Patent Application Ser. No. 62/431,479 entitled, "Method and Apparatus for Assigning Tasks to Computer System Elements" filed by Neil Carson on Apr. 4, 2017, each having the same assignee as the present application and each is hereby incorporated by reference in its entirety.

FIELD OF THE INVENTION

The present invention is related to computer software and hardware and more specifically to computer software and hardware for distributed computing.

BACKGROUND OF THE INVENTION

Computer systems can operate in a distributed fashion, with requests for work being distributed to multiple workers, which perform the work and output results. A worker may be a processor core, a processor or a computer system, each distinct from the other workers. The results may be returned to the requestor or may be sent to another worker to perform additional work. Conventional methods of assigning work to workers is suboptimal, What is needed is a system and method for assigning work to workers.

SUMMARY OF INVENTION

A system and method receives, requests for service, including parameters to be used to fulfil the request, assigns a unique identifier to the request and adds the request to a timetable containing at least the request identifier and optionally the request, for each of any number of requests as described in more detail below. The timetable is distributed to multiple workers who will perform the requests on the timetable. Each request is received with one of several possible priority levels that may indicate the urgency of the request, for example.

The timetable includes N+1 sets of lists of work, where N is the number of workers. The N sets of lists are for requests assigned to individual workers, with each worker knowing which of the N lists are for that worker. The "+1" additional set of lists are for work that is to be performed in part by multiple workers. Each set of lists contains up to one list per possible priority level.

When a request is received, a process that handles building the timetable identifies whether the request will be assigned to a single worker (and if so, which worker) or to multiple workers, and then selects the set of lists corresponding to the worker or the set of lists corresponding to multiple workers based on its assignment. The assignment may be made based on which worker has at least some of the data corresponding to the request (with worker selection made at random or round robin from among multiple workers who all have the same degree of access to the data), and how large the data corresponding to the request is or how long the request will take to process. If the data is particularly large or will take particularly long to process, the request may be assigned to multiple workers.

In one embodiment, the priority of the request is initially increased, for example, by one priority level, for requests that are received with a priority below a threshold level, and the request is assigned to the list corresponding to the priority level as optionally increased within the set of lists selected as described above and herein. The request is timestamped and, after a threshold period of time, the request is moved to the list on the timetable corresponding to the originally requested priority level within the same set of lists when the next other request is received and added to the timetable.

Each priority level corresponds to a weight, and the weight for each list for that priority level is multiplied by the number of uncompleted requests on the list to identify a list score, the list score for each list of the set corresponding to each worker is summed to produce an aggregate score for each worker, and the maximum aggregate list score is added to the timetable. An aggregate list score is also computed for the multi worker set of lists in the same manner using the same weights, and the aggregate list score for the multi worker set is also added to the timetable. The timetable is then distributed to all of the workers with a timetable serial number that is higher than the serial numbers of any timetable previously sent by the process or processes that build the timetables.

When the workers receive the timetable, they each perform the functions that will now be described. The worker checks the serial number of the timetable and discards it if the serial number is lower than the serial number of any timetable they previously received. Otherwise the worker uses the timetable as will now be described.

Certain requests are tracked for removal as described below. If an item tracked for removal is on a list in the timetable, it is removed from the timetable, and if it is not on the timetable, it is no longer tracked for removal.

At the end of a predetermined period of time, the worker increments a counter that counts the number of periods from a certain date and time that all workers use. Thus, the counter for all workers will be the same, within the tolerance of the clock the workers use to determine the end of the period. The worker then checks the set of lists for that single worker and the multi worker set of lists. If such checked lists are all empty, the worker will wait until the end of the next predetermined period and start the process described herein again.

If any such set of lists are not empty, the worker hashes or otherwise scrambles the counter and divides the bits in the results into three sets, each set of bits representing an integer. The first integer, referred to as the ratio integer, is then converted into an indicator of the set of lists the worker will use to process items. The conversion process converts the ratio integers to an indicator of one set of lists or the other, in approximately the same proportion as the proportion of the maximum aggregate score for all workers, and the aggregate score for the multi worker set of lists. If only one set of lists is not empty, the indicator is set to that list instead.

The second integer is referred to as the priority integer. The priority integer is used to select one list in the set of lists corresponding to the indicator, and selects the list approximately in proportion to the list score for each list, which may be sent with the timetable or computed.

The third integer is referred to as the item integer, and is used to select one request item from the list selected as described above so that each request on the list has an approximately equal chance at being selected.

Processing is then commenced for the request on the list selected. If the request has been partially processed, the state it was in when processing last ended is restored and processing continues from that state. Otherwise, processing of the request is initiated.

Near the end of the predetermined period, if the request is not complete, state is saved, and the method repeats at incrementing the counter as described above. If the request is complete, the request is tracked for removal as described above, and the process or processes that build the timetable is notified that the request is complete. If the request is assigned to a single worker list, the request is removed from the timetable by the process that distributes the timetable. If the request is assigned to a multi worker list, the request is removed from the multi worker list by the process that distributes the timetable when all workers have reported it as complete.

DETAILED DESCRIPTION OF A PREFERRED EMBODIMENT

Figure 1:
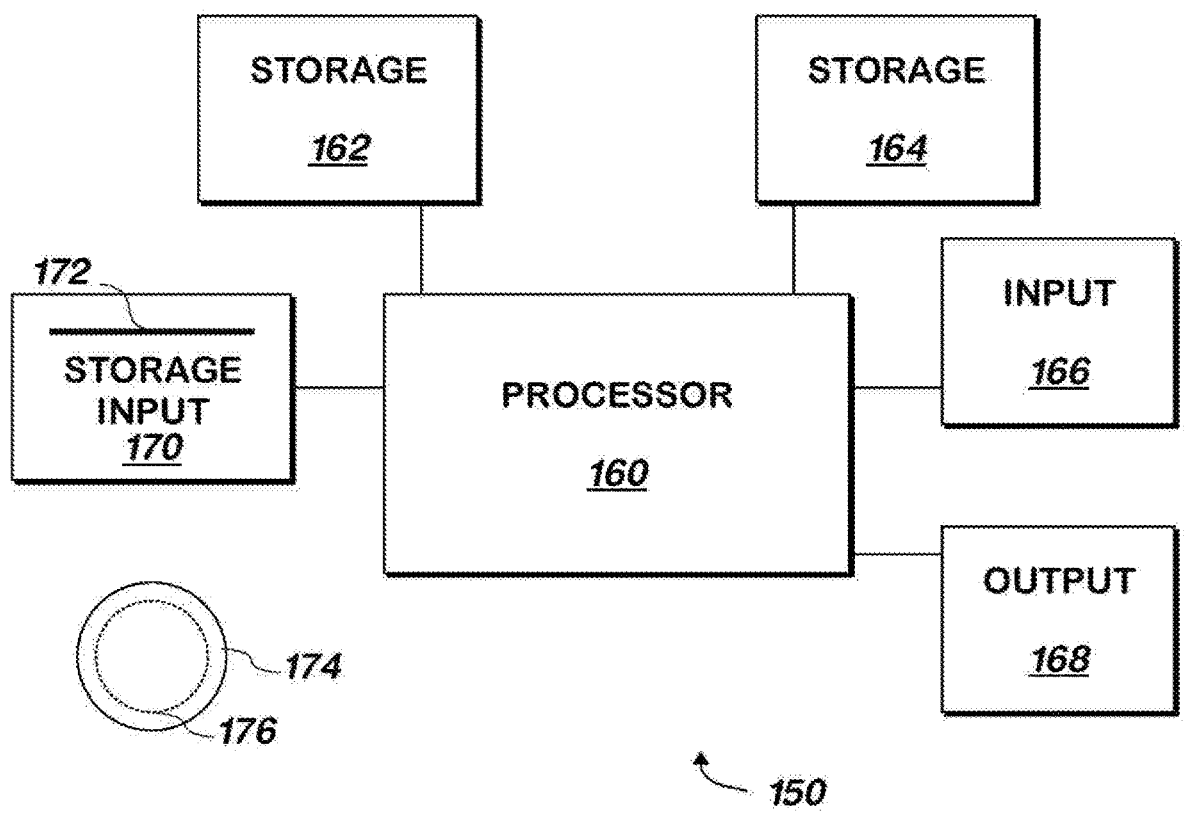
FIG. 1 is a block schematic diagram of a conventional computer system.

The present invention may be implemented as computer software running on a conventional computer system, with multiple processors, multiple cores within a processor, multiple computer systems, or any of these. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS SPARC ENTERPRISE M9000 SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XT, VISTA or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
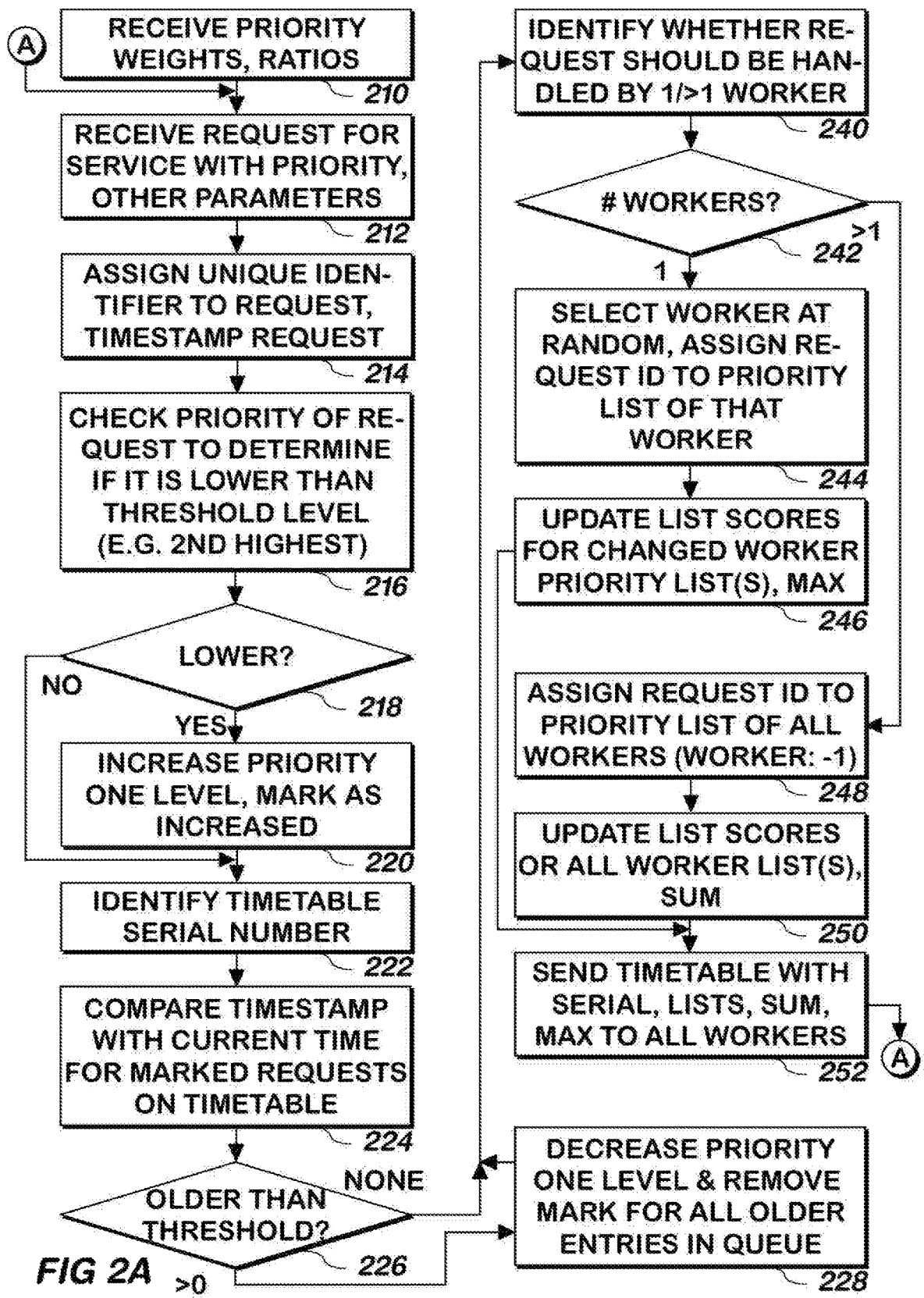
FIG. 2, consisting of FIG. 2A, FIG. 2B and FIG. 2C, and FIG. 3, are a flowchart illustrating a method of distributing work to workers that process the work according to one embodiment of the present invention.

Referring now to FIG. 2, consisting of FIGS. 2A, 2B and 2C, a method of processing requests by one or more of several workers is shown according to one embodiment of the present invention. The method additionally continues on FIG. 3. A set of priority weights and priority ratios is received 210 for use as described below. There are multiple priority levels and each priority level has a weight and a ratio.

A request for service is received 212. In one embodiment, the request is a query, though requests for other types of services may be used. The request is received with a desired priority level and other parameters, such as a query and an identifier of the data against which the query is to be run.

A unique identifier is assigned to the request and the current date and time is obtained as the timestamp of the request 214.

The desired priority of the request is checked 216 to determine if the request priority level is lower than a threshold level. The threshold level may be one or two levels below the highest priority level. As described in more detail below and herein, the priority levels of requests with a priority level below the threshold are temporarily increased by one level, and the threshold is two levels below the highest level, to prevent the priority from being increased to the highest level.

If the desired priority of the request is not below the threshold 218, the method continues at step 222 with the priority level of the request remaining as the desired priority level of the request, and otherwise 218, the priority level of the request is increased by one level or a different number of levels, the request is marked as having been increased 220, and the method continues at step 222.

At step 222, a serial number for a timetable, described below and herein, is identified. The serial number may be identified as the previous serial number plus one, or another scheme may fee used that ensures serial numbers are unique and that the most current timetable has the highest serial number.

A timetable built as described herein is consulted to identify if any request on the timetable is marked as having its priority level increased as described above, and with a timestamp older than a threshold amount of time from the current time. The current time may be considered to be the timestamp of the most recently received request or the true current time may be obtained. If there are no such requests on the timetable 226, the method continues at step 240 and otherwise 226, the priority level of all such requests are decreased 228 the same number of levels the priority was increased (e.g. one level) 240 and the method continues at step 240.

A determination is made 240 as to whether the request should be handled by one worker or by more than one worker. Such a determination may be made on the basis of whether one worker has, or can hold, all the data required to fulfill the request. A worker may be a process on a machine, a machine, or another entity. If the request is to be fulfilled by one worker 242, a worker is selected at random, or by selecting the worker with the access to, or the fastest access to, the data and the request is assigned on the timetable to one of several lists of that worker 244. Each list for a worker corresponds to a priority level, so for example, if there are four priority levels, each worker will have on the timetable four lists, one for each priority level, though some lists may be empty and an empty list may not physically appear on the timetable in some embodiments. In one embodiment, all workers share the same timetable and in another embodiment, each worker has their own timetable only showing requests that are to be performed in whole or in part by that worker. To assign the request to a worker, the request identifier and the mark, if applicable, is added to the priority list that corresponds to the priority of the request, which may have been modified as described below and herein. The priority of a request is the requested priority, unless changed as described herein.

A list score for each list of each worker is maintained, either on or off the timetable, and the list scores for the lists altered are updated 246 to reflect the addition of the request to the list, and to reflect any changes made to the lists by lowering of the priority level after the threshold amount of time as described herein and above. The list score is identified by, for each list, multiplying the number of requests on the list by the weight for the priority level to which the list corresponds. In addition, the maximum sum of the list scores for all list of requests assigned to any single worker is identified and stored on the timetable or on the timetable for each worker. The method continues at step 252.

If the request is to be assigned to more than one worker 242, such as all workers, the request identifier is added 248 to one of several lists of requests for "all workers", with one list for each priority level. In one embodiment, the timetable contains the lists for all of the single worker-assigned requests with an identifier of the worker, and the lists for multiple-worker assigned requests with a special worker identifier of −1 to indicate the lists are for all workers. Assignment is made by adding the request identifier and the mark, if applicable, to the list corresponding to the priority level, as may have been adjusted, of the project. Each worker is assigned a unique worker identifier that is stored by each such worker.

A list score equal to the product of the number of requests on a list and the weight of the priority level of the list is computed for each list of requests assigned to multiple workers, the products are summed and the list scores and sum are stored on the timetable 250 for each list altered by adding or removing a request from the list in the same manner as the single worker lists described above. The list score need not be recomputed for any list that has not changed since the last such computation.

A version of the timetable is sent or otherwise made available to all of the workers. In one embodiment, the timetable includes the lists for each worker, though in another embodiment, there is a separate timetable for each worker that excludes the lists that apply only to each of the other workers. The marks need not be sent with the remainder of the timetable. The method continues at step 260 of FIG. 2B. FIG. 2B illustrates the operation of one worker, but each of several workers performs the steps of FIG. 2B simultaneously with the other workers.

At step 260, the timetable is received or retrieved and the serial number of the timetable is compared against the serial number of another timetable most recently stored and not discarded by the worker. If the serial number of the timetable received is greater than the serial number of the timetable most recently stored and net discarded by the worker, the method continues at step 264, and otherwise 262, the timetable received is discarded 266 and the method continues at step 260.

At step 264, the timetable received is checked to determine whether any tracked items on a list of such tracked items described below are on the timetable, and if so, they are removed from it. Any tracked items not located are removed from the list of items to be tracked. The most recently stored and not discarded timetable is replaced in storage by the timetable received and optionally altered by removing any tracked items located. The received timetable is then considered to be the most recently received and not discarded timetable and the method continues at step 260.

When any timetable has been stored by a worker, the worker performs the method of FIG. 2C, with each worker performing such method simultaneously with the other workers, of which there may be any number.

The worker waits until the end of a period 270. The end of a period may be identified by an operating system timer that is set upon receipt of the first timetable and then reset when the timer elapses as part of step 270. A timer that is initialized to a predetermined number by all workers upon system startup is incremented by a fixed number, such as 1, that all workers use 272. The stored timetable is consulted to determine whether all of the lists on the timetable that apply to the worker are empty as part of step 272. A list applies to a worker if it is one of the lists that has the worker's unique identifier, which is stored by each worker, or of it has the special worker identifier, such as −1, that indicates the list applies to all workers. If all of the lists on the timetable are empty 274, the method continues at step 270, and otherwise 274, the method continues at step 276.

At step 276, the timer is hashed or otherwise scrambled using any conventional hash routine or other algorithm, such as the conventional Murmr3 algorithm. All workers use the same period, and the same hash function or other algorithm, and thus, their timers and hash results or scramble results are always at the same value, within a tolerance, such as the tolerance of the timer used to indicate the end of the period.

The scrambled or hashed counter is converted to three integers, such as by using approximately one third of the bits of the scrambled or hashed timer for each integer. The three integers are referred to herein as the ratio integer, the priority integer and the item integer.

The ratio integer is converted 278 to an indicator that indicates that a single worker list should be selected or a multi worker list should be selected. The conversion is done by first checking the ratio of the sum of the multi worker list scores to the maximum sum of the single worker list scores stored on the timetable, and two ranges of possible ratio integer values are identified having at least approximately the same ratio. A determination is made as to which range the ratio integer falls in and the indicator is selected as single worker or multi worker based on that range. For example, if the maximum sum of the list scores among the single workers is 10 and the sum of the multi worker list scores is 90, and the range of ratio integers is 0 to 99, the range of 0-9 may be assigned to single workers and the range of 10-99 may be assigned to multi workers. If the ratio integer is in the range of 0-9, the indicator is set to single workers, and otherwise is set to multi workers. It is noted that the possible ranges are set forth to make the examples easy to see, and are not intended to be representative of real ranges. All such conversions described herein may use ranges that approximate the desired criteria, it is not necessary that the conversions exactly meet the criteria for them. The lists corresponding to the indicator are checked to see if all such lists are empty. The method continues at step 284.

If, for the worker, the lists corresponding to the indicator are all empty 284 (i.e. the indicator is set to multi worker and all multi worker lists are empty, or the indicator is set to single worker and all single worker lists for that worker are empty), the indicator is set to the opposite value 286 and the method continues at step 288 and otherwise 284, the method continues at step 288.

At step 288, the priority integer is converted into an identifier of a priority list using the priority ratios by dividing the possible values of priority integers to ranges for each priority list in the same ratio. For example, if the ratio of low:medium:high:critical is 1:2:4:8, and the possible ranges of priority integers is 0-149, the range of 0-9 may be assigned to the lowest priority level.

The item integer is converted 290 to an identifier of one request on the list identified in step 288 of the indicator of steps 278-282. The conversion may be performed by identifying the number of requests on the list, and if the number is greater than one, taking the item integer modulo the number of items on the list and selecting the request corresponding to the result, with the first item corresponding to result "0", the next item corresponding to result "1", and so on.

The request and any saved state is retrieved and performed 292 to the extent possible, starting from the saved state, or from the beginning (if no state was saved), up to the end of the next predetermined period of time described above with respect to step 270, less an allowance of time for saving state and performing the other functions described herein. The request may have been partially completed, with the state of the request saved after it was partially completed and so the state is retrieved with the request and the performance of the request resumes at the point indicated by the saved state. If no state is saved, performance of the request is initiated. The request and the state may be part of the timetable, the request having been included with the timetable, though in one embodiment, the timetable contains a reference to the request, which is retrieved using the reference. The state of the request is checked to determine if the request is complete as part of step 292, though this part may be performed after the end of the time period described in step 270.

Figure 3:
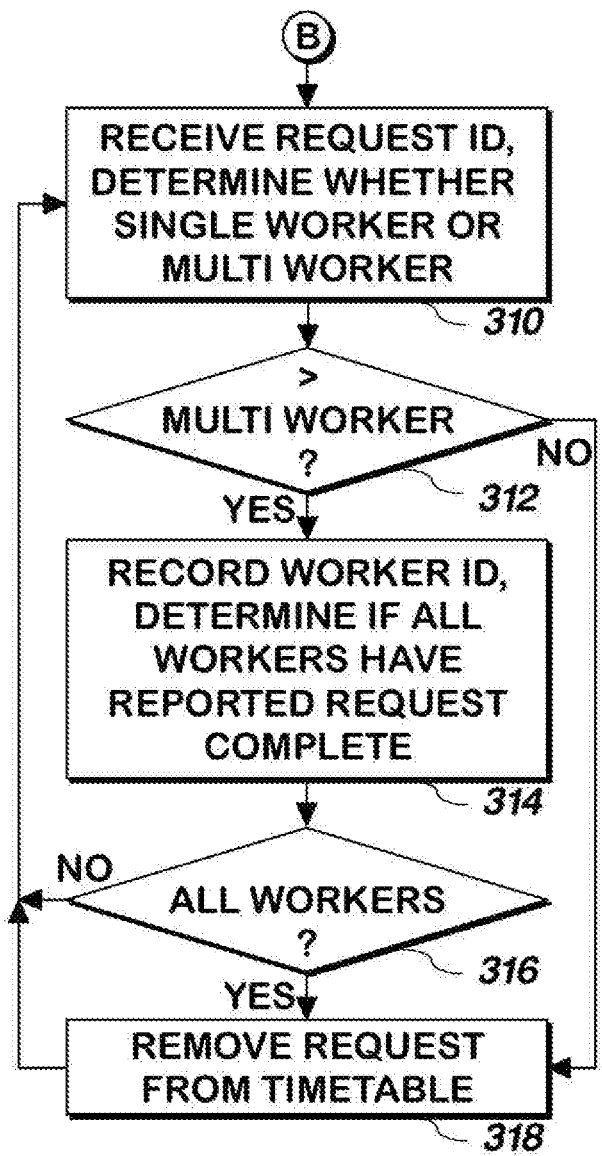

If the request is complete 294, the completed item is removed from the timetable stored by the processor or other element that completed the request, the identifier of the request is added to a list of request identifiers which the processor is tracking as described herein, the identifier of the request is reported to the process or other element that originates the timetables, such process or other element being on the same processor or other element or a different one than the one processing the request 296, and the method continues at step 310 of FIG. 3 and at step 270. If the request is not complete 294, state of the processing of the request is saved for subsequent resumption of processing 298 and the method continues at step 270.

Referring now to FIG. 3, at step 310, the request completion message sent as described above is received. The request completion message may include the identifier of the request and either includes an identifier of the worker or is sent in a manner that allows the worker identifier to be determined by the recipient of the message. The timetable is used to locate the request identifier and, using the list on which the request identifier resides, it can be determined whether the request was assigned to a single worker or multiple workers. In another embodiment the request completion message contains such information.

If the request was not assigned to multiple workers 312, the method continues at step 318 and otherwise 312, the worker identifier of the worker who sent the request completion message is recorded with the request identifier, and a determination is made as to whether all of the workers have provided request completion messages for that request 314 using any recorded worker identifiers for that request identifier and a list or other indication of the worker identifiers of all of the workers. If not 316, the method continues at step 310 and otherwise, the method continues at step 318.

At step 318, the request identifier is removed from the timetable that is distributed, or used to distribute the timetable, to the workers.

Additional Enhancements

In one embodiment, if the indicator is being switched from multi worker to single worker when the yes branch of step 284 is taken, the highest non-empty priority list is selected regardless of the priority integer.

In one embodiment, if the indicator was being switched from single worker to multi worker when the yes branch of step 284 is taken, a second counter may be initialized to one increment past the current value, hashed or scrambled in the same manner as the original counter, separated into three integers, and the ratio integer is tested to identify whether it will correspond to the value the indicator is about to be switched into. If so, the integers used as described above will be those from the second counter, not the first. This will provide a higher probability that the multi worker request processed by that worker is the request the other workers who do not switch their indicators will process next, provided the timetable doesn't change, allowing the worker to finish processing the request early.

In such embodiment, if the multi worker request is not processed to completion, and there is no new timetable received and stored as described above during the period in which the multi worker request was processed, the original counter will be incremented to the value or the second counter and thus, processing will continue for the request, and so state need not be saved, meaning processing continues for two periods under that circumstance. If, however, processing completes, a new timetable is stored during the period in which the processing of the multi worker request was performed, and if no new multi worker entries appear in any multi worker list, the pre-incremented value of the counter is used to generate the three integers as described above, even though the counter is incremented to the value of the second counter, and such incremented value is not used. Thus, in this special case, when the second counter is used to essentially jump ahead one counter value, and if the multi worker request that was processed turns out to be the request that was to be processed in the next period, the allocation of work among the two indicators is essentially swapped in such two periods. If, however, no new timetable is received, processing continues as described above, which causes a different multi worker request to be processed by using from the first counter or the second counter, the same integer values that had been generated from the second counter, though the timetable, on the worker that just completed the multi-worker request will have such recently completed request removed.

System

Figure 4:
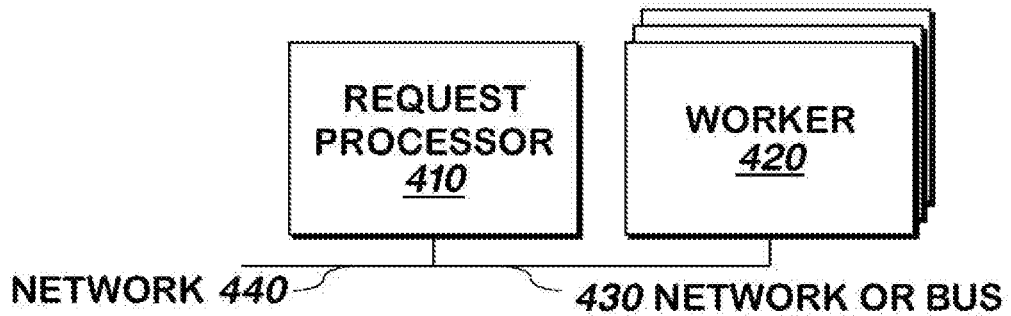
FIG. 4 is a block schematic diagram of a system for distributing work to workers that process the work according to one embodiment of the present invention.

FIG. 4 illustrates a system for processing requests according to one embodiment of the present invention. A request processor 410 is coupled to multiple workers 420 via a network or bus 430. In the event that the request processor 410 is coupled co workers 420 via a bus 430 a network connection 440 to receive requests, provide results of the requests, and receive information as described herein, is also used, and otherwise network 440 is part of network 430, which may be an Ethernet network, the networks of the Internet, or all of these.

Figure 5:
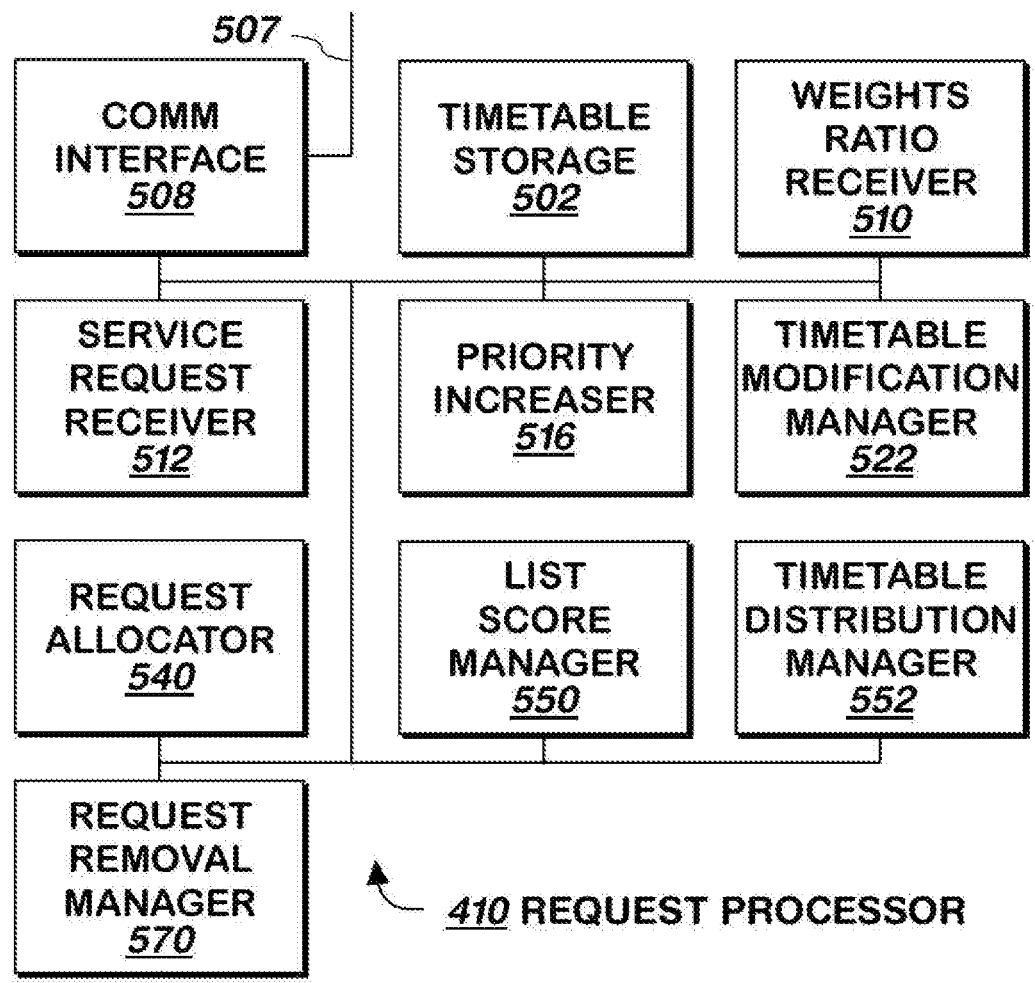
FIG. 5 is a block schematic diagram of a request processor of FIG. 4 according to one embodiment of the present invention.

FIG. 5 is a request processor 410 of FIG. 4 shown in more detail according to one embodiment of the present invention. An input and output are coupled to elements of FIG. 5. All elements may contain an output and an input drawn as a single line on the Figure, and all information is received by an element via its respective input and is provided via its respective output. All connections are in place to allow the data communication described herein.

Communication interface 508 includes a conventional communication interface, such as a conventional TCP/IP-compatible communication interface running suitable communication protocols, such as TCP/IP, Ethernet or both, and may be coupled via an input/output 507 to a network, such as an Ethernet network, the Internet, or both. Inputs and outputs of the system of FIG. 5 are made via input/output 507 of communication interface 508. Communication Interface 508 may additionally include a conventional bus interface in the event that a bus is used to connect request processor 410 to the workers 420.

Weights ratio receiver 510 receives at an input coupled to an output of communication interface 508 the weights and ratio information described above, and provides them at an output.

Service request receiver 512 receives service requests via communication interface 508, such service requests being as described above and herein. Service request receiver 512 assigns a unique identifier to the request and timestamps it, by retrieving the current time from a system clock or other clock. Service request receiver 512 provides the request, the identifier and the timestamp to priority increaser 516.

When it receives such information, priority increaser 516 determines if the priority level specified in the request is above the threshold, which it internally stores. If not, it increases the priority level of the request and sets a mark with the request, and otherwise does not increase the priority and clears the mark. Priority increaser 516 then provides the information it receives, and the mark to timetable modification manager 522.

When it receives such information, timetable modification manager 522 retrieves the timetable from timetable storage 502 and uses the timestamp to determine whether any requests with a mark set on the timetable were received at least the threshold amount of time before the most recently-received request. If so, it moves them from the list they occupy to the next lowest priority list for the same single worker or all worker set of lists and clears the respective mark, marks the list as modified, and provides the timetable, as optionally updated, and the information it received to request allocator 540.

When it receives such information, request allocator 540 identifies whether the request should be handled by one worker or all workers as described above. It the request should be handled by one worker, request allocator 540 identifies the worker as described above and adds the request identifier to the list corresponding to the worker it identified and the priority of the request, as optionally modified. Otherwise, request allocator 540 adds the request identifier to the list for the priority level of the request, as optionally modified, for all workers. Request allocator 540 marks such list as modified on the timetable. Information from the request (e.g. the query and the data sets on which the query is to be run) is added to a data structure that includes the timetable (which has all of the lists) by request allocator 540, and request allocator provides the data structure to list score manager 550.

When it receives the data structure, list score manager 550 calculates a list score as described above for any list that doesn't have one or is marked as modified, using the weights it receives from weights ratio receiver 510, adds the list scores to the timetable, identifies the maximum sum of the list scores for each worker, and the sum of the list scores for the multi-worker lists, divides the former by the latter and adds the result to the timetable as the ratio. List score manager 550 optionally adds to the timetable the priority weights and ratios it retrieves from weights ratio receiver 510, provides the timetable to timetable distribution manager 552 and stores the timetable into timetable storage 502. All elements labeled as storage may include memory or disk storage and may include a conventional database.

When it receives the timetable, timetable distribution manager 552 strips the information from the timetable that is not used by the workers (such as marks), adds a unique identifier to the timetable that is higher than the identifiers of the timetables previously distributed and internally stores the identifier for use in identifying the timetable identifier for the next timetable, and distributes the timetable to each of the workers, either via communication interface 508, across a bus or network 430, or otherwise.

Figure 6:
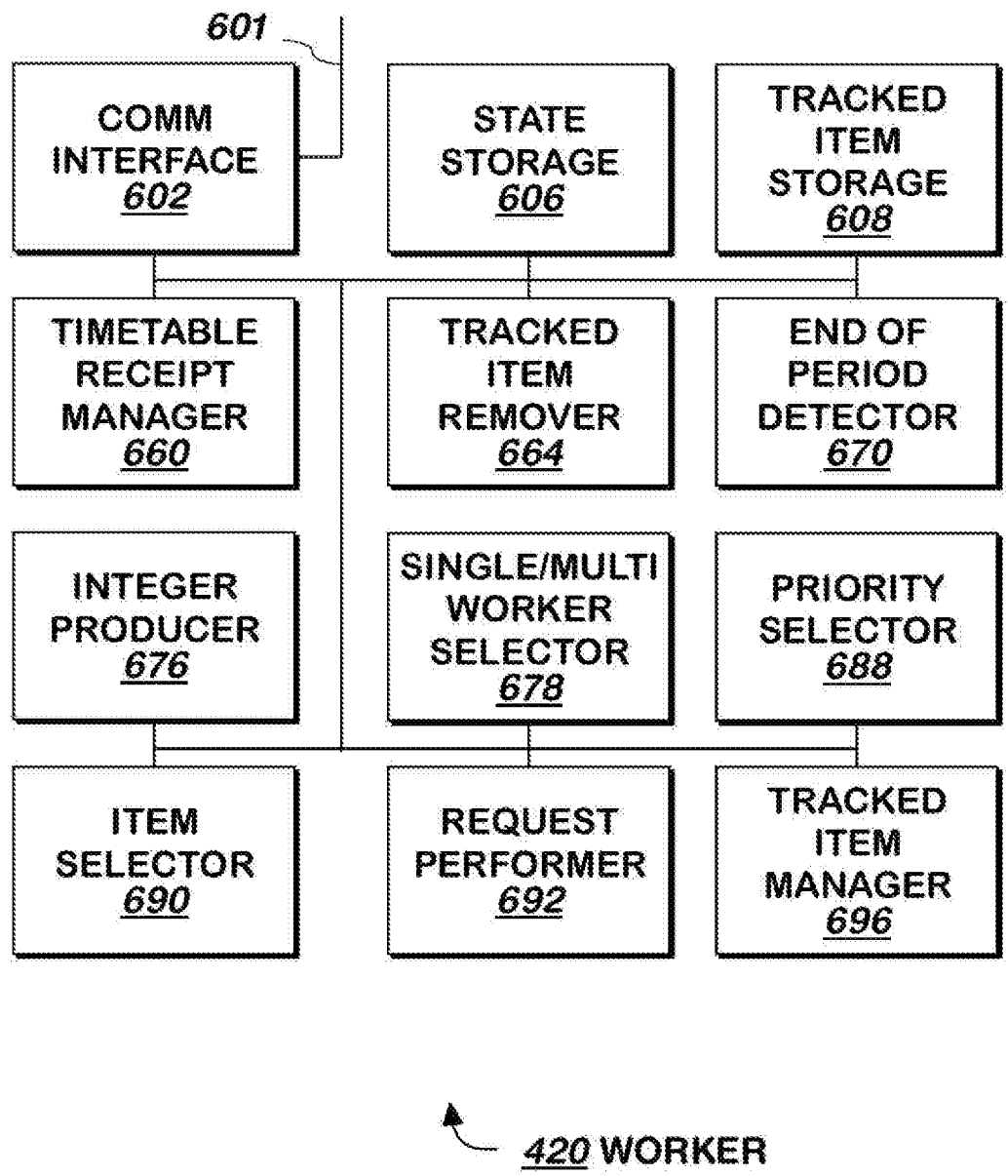
FIG. 6 is a block schematic diagram of a worker of FIG. 4 according to one embodiment of the present invention.

FIG. 6 shows a representative worker 420 of FIG. 4 in more detail according to one embodiment of the present invention. Each worker includes a conventional, communication interface 602, which may be similar to communication interface 502 and has an input/output coupled to network 430. If such communication is made via a bus, communication interface 602 includes a conventional bus interface.

Timetable receipt manager 660 receives the timetable distributed by timetable distribution manager 552 of FIG. 5 and compares the identifier of the timetable to the most recent timetable received and not discarded. If none has been received and not discarded, a default value of zero may be used. If the identifier is above the one most recently received and not discarded, timetable receipt manager 660 provides the timetable to tracked item remover 664, and otherwise, timetable receipt manager 660 discards the timetable.

When it receives the timetable, tracked item remover 664 retrieves the list of tracked request identifiers from tracked item storage 608, compares the items on the timetable that are either on the timetable set of lists for the worker or on the timetable set of multi worker lists, identifies any of A) the request identifiers on any of such lists and retrieved from tracked item storage 608, or B) those retrieved from tracked item storage 608 but not on any of such lists of the timetable and makes the following changes. Identifiers corresponding to A) are removed from the timetable and the list scores are recalculated for any lists from which identifiers are removed and stored on the timetable, replacing their previously existing values. In one embodiment, the result of the maximum sum divided by the sum of the list scores for the multi worker lists are updated on the timetable by tracked item remover if such removal would result in a change, and in another embodiment, they are not updated so that all workers will work from the same result. Identifiers in B) retrieved from tracked item storage 608 but not on the timetable are removed from tracked item storage 608 by timetable receipt manager 660. Tracked item remover 664 provides the timetable, as optionally modified, to single/multi worker selector 678, which it internally stores, overwriting any timetable it previously internally stored.

End of period detector 670 receives the timetable and internally stores it. End of period detector 670 waits until the end of the period, which it identifies as described above, increments the counter, which is initialized to a starting value (such as zero) on system startup, and checks the timetable to determine if both the set of lists for the worker, and the set of lists for all workers, are empty. If so, end of period detector 670 waits for the end of the next period and repeats the process. In one embodiment, the timetable is only checked as described above after it is identified as empty if a new timetable is received, and otherwise is treated as if the check resulted in an empty determination, without actually checking. If such lists are not empty, end of period detector 670 provides the counter to integer producer 676.

When it receives the counter, integer producer 676 hashes or otherwise scrambles the counter as described above and converts the result into the three integers described above. Integer producer 676 provides the three integers and the timetable to single/multi worker selector 678.

When it receives such information, single/multi worker selector 678 uses the ratio of the timetable and the ratio integer to create a single worker/multi worker indicator as described above and checks the set of lists corresponding to the indicator.

In one embodiment, the single worker set of lists are ordered in order of the identifier of the single worker to which the set corresponds and the elements of each worker are coded with their worker identifiers when or after the code for such elements is distributed to them, either automatically or upon their request, or they or one of them may use one or more identifiers of the computer hardware in which they reside to determine their worker identifier, and such worker identifier is made available to each of the elements that require it. The timetable may contain pointers to the start of each set of lists in worker identifier order, with the first set of lists being the multi-worker set of lists, and the elements can use the pointer corresponding to their worker identifier to locate their set of lists.

If the set of lists corresponding to the single worker/multi worker indicator for the worker is empty, single/multi worker selector 678 toggles the indicator to the other value, and otherwise uses the indicator it identified as described above. Single/multi worker selector 678 provides the timetable, the priority and item integers, and the single worker/multi worker indicator to priority selector 688.

When it receives such information, priority selector 688 uses the priority ratios from the timetable (or a predefined set of priority ratios) and the priority integer to identify a priority indicator as described above.

In one embodiment, priority selector 688 checks the list corresponding to the single worker/multi worker indicator and the priority indicator to make sure it isn't empty. If it is empty, priority selector 688 changes the priority indicator to the priority level of the highest nonempty list, or the priority level of the next highest or next lowest non-empty list, or the priority level of the list with the most items or the priority level of the list with the highest list score, and otherwise, priority selector uses the priority indicator it identified, and provides the item integer, the single worker/multi worker indicator, the priority indicator and the timetable to item selector 690.

When it receives such information, item selector 690 uses the timetable list corresponding to the two indicators it received and the item integer to identify an item indicator that uniquely identifies an item on the list as described above and provides the timetable and three indicators to request performer 692.

When it receives such information, request performer 692 sets a timer, such as by using the operating system, locates the request identifier corresponding to the three indicators and the timetable, and checks state storage 606 for the request identifier. The timer will elapse before the end of the period used by end of period detector 670 with sufficient time for saving state, if needed. If the request identifier is not in state storage 606, request performer 692 at least initiates the performance of the request, for example by initiating a query or a portion of a query. If the request identifier is in state storage, request performer 692 retrieves the state information from state storage 606 that corresponds to the request and resumes performing the request from that state.

If request performer 696 does not complete the request by the time the timer elapses, request performer 696 saves state (in place of any prior saved state for the request in saved state storage 606) and the request identifier into state storage 606 so that it can resume performing the request at such time as the request is selected again using the three indicators and the timetable. State includes all information necessary to produce results from the point it last left off. End of period detector 670 will then initiate the next iteration of the process as described herein.

If request performer 692 completes the request, it provides the request identifier to tracked item manager 696 and provides the request identifier and the single worker/multi worker indicator to request removal manager 570 and removed any saved state for the request from saved state storage 606. Tracked item manager 696 adds the request identifier it receives to tracked item storage 608 and provides the request identifier to single/multi worker selector 678, which removes the request from the timetable.

When it receives the request identifier and the single worker/multi worker identifier, request removal manager 570 checks the value of the single worker/multi worker indicator it received. If its value is single worker, request removal manager 570 removes it from the timetable in timetable storage 502. In one embodiment, timetable storage 502 is used via a conventional lock mechanism to prevent access by more than one element at a time. To access the timetable to ultimately write it, an element checks the lock and only accesses it if it's free. If so, it sets a lock flag and then reads, modifies and writes the timetable. Other forms of locks may also be implemented.

If the value of the indicator is multi worker, request removal manager 570 checks the request identifier to determine if all of the other workers or all of the other workers to which the request was assigned have indicated they completed the request. If so, request removal manager 570 removes the request from the timetable in timetable storage 502 and deletes the counter or list of workers associated with the request identifier it internally stores as described above and otherwise records the completion by incrementing the internally stored counter for the request if it exists or by creating it and setting it equal to one if it does not exist, or by internally recording an identifier of the worker which request performer 692 may additionally provide with the request identifier.

CERTAIN EMBODIMENTS

Described is a method of identifying a work request to process, including:

receiving a first two or more lists of at least one work request for performance by a worker in a two or more workers, each worker including at least a portion of a computer system, each list in the first two or more corresponding to a different priority level in two or more priority levels;

receiving a second two or more lists of at least one work request for performance by more than one of the two or more workers, each list in the second two or mere corresponding to a different priority level;

receiving or computing a maximum list score identifying a highest total score among the first two or more lists for each of the two or more workers, the total score for each worker in the two or more including a sum of list scores for each list in the first two or more for said worker, each list score including a weight corresponding to the priority level for said list, multiplied by a number of work requests on said list;

receiving or computing, a total multi worker score, the total multi worker score including a sum of multi-worker list scores for each list in the second two or more, each multi-worker list score including a weight corresponding to the priority level for said list, multiplied by a number of work requests on said list;

identifying an end of a period of time;
responsive to the end of the period of time:
incrementing a counter;
receiving or computing a first range and a second range having a proportion to one another equal to a proportion of the total multi worker score to the maximum list score, each range not overlapping one another;
identifying a first integer responsive to a first portion of the counter, the first integer having potential values that at least span the first range and the second range;
determining whether the first integer is in the first range;
responsive to the first integer determined to be in the first range, selecting the first two or more lists, and responsive to the first integer not determined to be in the first range, selecting the second two or more lists; and
selecting the work request responsive to the selected two or more lists.

The method optionally additionally includes:
checking the two or more lists selected responsive to the first integer to determine if said selected two or more lists is empty; and
responsive to said two or more lists determined to be empty, selecting two or more lists not selected.

The method may include optional features whereby selecting the work request from the selected list comprises:

identifying a second integer responsive to a second portion of the counter different from the first portion of the counter;

computing or receiving a two or more different priority ranges spanning potential values of the second integer identified, one priority range for each priority level in the two or more, each priority range including a different number of potential values of the second integer from other priority ranges;

identifying one of the two or more different priority ranges into which the second integer falls; and selecting the work request from the list from the selected two or more lists for the priority level corresponding to the identified priority range.

The method may include optional features whereby, a priority range for a higher priority level has more potential values of the second integer than a priority range for a lower priority level.

The method may include optional features whereby the selecting the work request from the list from the selected two or more lists for the priority level corresponding to the identified priority range comprises:

identifying a third integer responsive to a third portion of the counter different from the first portion of the counter and the second portion of the counter;

converting the third integer into a selection integer having possible values corresponding to a number of work requests on the list selected from the selected two or more lists for the priority level corresponding to the identified priority range; and selecting the work request from the list selected from the selected two or more lists for the priority level corresponding to the identified priority range responsive to the selection integer.

The method may include optional features whereby the converting is performed using a modulus or modulo function.

Described is a system for identifying a work request to process, including:

a timetable receipt manager having an input for receiving a first two or more lists of at least one work request for performance by said worker, each list in the first two or more corresponding to a different priority level in a two or more priority levels, a second two or more lists of at least one work request for performance by more than one of the two or more workers, each list in the second two or more corresponding to a different priority level, and a maximum list score identifying a highest total score among the first two or more lists for each of the two or more workers, the total score for each worker in the two or more including a sum of list scores for each list in the first two or more for said worker, each list score including a weight corresponding to the priority level for said list, multiplied by a number of work requests on said list, the timetable receipt manager for receiving at the timetable receipt manager input or computing, a total multi worker score, the total multi worker score including a sum of multi-worker list scores for each list in the second two or more, each multi-worker list score including a weight corresponding to the priority level for said list, multiplied by a number of work requests on said list; and for providing at an output the first two or more lists, the second two or more lists, the maximum list score and the total multi worker score, an end of period detector, for identifying at an end of a period of time and for providing at an output a signal responsive to the end of the period of time identified;

an integer producer having an input coupled to the end of period detector output for receiving the signal, the integer producer for, responsive to the signal, incrementing a counter, identifying a first integer responsive to a first portion of the counter, and providing at an output the first integer;

a single/multi worker selector having an input coupled to the timetable receipt manager output for receiving the maximum list score and the total multi worker score and coupled to the integer producer output for receiving the first integer, the single/multi worker selector for allocating at least some potential values of the first integer into a first range and a second range having a proportion to one another equal to a proportion of the total multi worker score to the maximum list score, each range not overlapping one another, for determining whether the first integer is in the first range, and responsive to the first integer determined to be in the first range, providing at an output an indicator having a first state, and responsive to the first integer not determined to be in the first range, providing at the single/multi worker selector output the indicator having a second state; and an item selector having an input coupled to the single/multi worker selector output for receiving the indicator, and to the timetable receipt manager for receiving at least one selected from a group including the first two or more lists and the second two or more lists, the item selector for selecting the work request from one of the first or second two or more lists responsive to the indicator state and for providing the selected work request at an output.

The system may include optional features whereby:

the item selector input is for receiving the first two or more lists and the second two or more lists; and the item selector selects the work request by checking one of the first two or more lists and the second two or more lists responsive to the indicator received to determine if said one two or more lists is empty, and responsive to said one two or more lists determined to be empty, selecting the work request from a two or more lists not determined to be empty.

The system:

may include optional features whereby the integer producer is additionally for identifying a second integer responsive to a second portion of the counter different from the first portion of the counter and providing the second integer at the integer producer output;

may additionally include a priority selector having an input coupled to the integer producer output for receiving the second integer, either for receiving at the priority selector input or calculating, a two or more different priority ranges spanning potential values of the second integer identified, one priority range for each priority level in the two or more, each priority range including a different number of potential values of the second integer from other priority ranges, the priority selector for identifying at an output an identifier of a priority level for one of the two or more different priority ranges into which the second integer falls; and may include optional features whereby:

the item selector input is additionally coupled to the priority selector output for receiving the identifier of the priority level; and the item selector selects the work request from the list for the priority level corresponding to the priority level received at the item selector input from the one of the first or second two or more lists responsive to the indicator state.

The system may include optional features whereby, a priority range for a higher priority level has more potential values of the second integer than a priority range for a lower priority level.

The system may include optional features whereby:

the integer producer is additionally for identifying a third integer responsive to a third portion of the counter different from the first portion of the counter and the second portion of the counter, and providing the third integer at the integer producer output;

the item selector input is additionally coupled to the integer producer output for receiving the third integer;

the item selector is additionally for converting the third integer Into a selection integer having possible values corresponding to a number of work requests on the list for the priority level corresponding to the priority level received at the item selector input from the one of the first or second two or more lists responsive to the indicator state; and the item selector selects the work request from the list for the priority level corresponding to the priority level received at the item selector input from the one of the first or second two or more lists responsive to the indicator state, responsive to the selection integer.

The system may include optional features whereby the item selector performs the converting using a modulus or modulo function.

Each system element may include a conventional hardware processor or hardware processor system or processor system or processor that Is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa and any system element may be connected to any other system element.

Described is a computer program product including a nontransitory computer useable medium having computer readable program code embodied therein for identifying a work request to process, the computer program product including computer readable program code devices configured to cause a computer system to:

receive a first two or more lists of at least one work request for performance by a worker in a two or more workers, each worker including at least a portion of a computer system, each list in the first two or more corresponding to a different priority level in a two or more priority levels;

receive a second two; or more lists of at least one work request for performance by mere than one of the two or more workers, each list in the second two or more corresponding to a different priority level;

receive or compute a maximum list score identifying a highest total score among the first two or more lists for each of the two or more workers, the total score for each worker in the two or more including a sum of list scores for each list in the first two or more for said worker, each list score including a weight corresponding to the priority level for said list, multiplied by a number of work requests on said list;

receive or compute, a total multi worker score, the total multi worker score including a sum of multi-worker list scores for each list in the second two or more, each multi-worker list score including a weight corresponding to the priority level for said list, multiplied by a number of work requests on said list;

identify an end of a period of time;

responsive to the end of the period of time:

increment a counter;

receive or compute a first range and a second range having a proportion to one another equal to a proportion of the total multi worker score to the maximum list score, each range not overlapping one another;

identify a first integer responsive to a first portion of the counter, the first integer having potential values that at least span the first range and the second range;

determine whether the first integer is in the first range;

responsive to the first integer determined to be in the first range, select the first two or more lists, and responsive to the first integer not determined to be in the first range, select the second two or more lists; and select the work request responsive to the selected two or more lists.

The computer program product may additionally include computer readable program code devices configured to cause the computer system to:

check the two or more lists selected responsive to the first integer to determine if said selected two or more lists is empty; and responsive to said two or more lists determined to be empty, select two or more lists not selected.

The computer program product may include optional features whereby the computer readable program code devices configured to cause the computer system to select the work request from the selected list comprise computer readable program code devices configured to cause the computer system to:

identify a second integer responsive to a second portion of the counter different from the first portion of the counter;

compute or receive a two or more different priority ranges spanning potential values of the second integer identified, one priority range for each priority level in the two or more, each priority range including a different number of potential values of the second integer from other priority ranges;

identify one of the two or more different priority ranges into which the second integer falls; and select the work request from the list from the selected two or more lists for the priority level corresponding to the identified priority range.

The computer program product may include optional features whereby, a priority range for a higher priority level has more potential values of the second integer than a priority range for a lower priority level.

The computer program product may include optional features whereby the computer readable program code devices configured to cause the computer system to select the work request from the list from the selected two or more lists for the priority level corresponding to the identified priority range comprises computer readable program code devices configured to cause the computer system to:

identify a third integer responsive to a third portion of the counter different from the first portion of the counter and the second portion of the counter;

converting the third integer into a selection integer having possible values corresponding to a number of work requests on the list selected from the selected two or more lists for the priority level corresponding to the identified priority range; and select the work request from the list selected from the selected two or more lists for the priority level corresponding to the identified priority range responsive to the selection integer.

The computer program product may include optional features whereby the computer readable program code devices configured to cause the computer system to convert use a modulus or modulo function.

What is claimed is:

1. A method of identifying a work request to process, comprising:

receiving a first plurality of lists of at least one first work request for performance by a worker in a plurality of workers, each worker in the plurality comprising at least a portion of a computer system, each list in the first plurality corresponding to a different priority level in a plurality of priority levels;

receiving a second plurality of lists of at least one second work request for performance by more than one of the plurality of workers, each list in the second plurality corresponding to a different priority level; in the plurality of priority levels in the plurality of priority levels;

receiving or computing a maximum list score identifying a highest of a plurality of total scores among the first plurality of lists for each of the plurality of workers, the total score for each worker in the plurality comprising a sum of list scores for each list in the first plurality for said worker, each list score for a list comprising a first weight corresponding to the priority level for said list, multiplied by a number of first work requests on said list;

receiving or computing, a total multi worker score, the total multi worker score comprising a sum of multi-worker list scores for each list in the second plurality, each multi-worker list score for a list comprising a second weight corresponding to the priority level for said list, multiplied by a number of second work requests on said list;

identifying an end of a period of time;

responsive to the end of the period of time:

receiving or computing a first range and a second range, the first range and the second range having a proportion to one another equal to a proportion of the total multi worker score to the maximum list score, each range not overlapping one another;

identifying a first integer, the first integer having potential values that at least span the first range and the second range;

determining whether the first integer is in the first range;

responsive to the first integer determined to be in the first range, selecting the first plurality of lists, and responsive to the first integer not determined to be in the first range, selecting the second plurality of lists; and selecting the work request responsive to the selected first plurality of lists or second plurality of lists.

2. The method of claim 1, additionally comprising:

checking the selected first plurality of lists or second plurality of lists responsive to the first integer to determine if said selected plurality of lists is empty; and responsive to said plurality of lists determined to be empty:

selecting the first plurality of lists or the second plurality of lists not selected; and
unselecting the plurality of lists that are empty.

3. The method of claim 1, wherein selecting the work request responsive to the selected first plurality of lists or second plurality of lists comprises:
   identifying a second integer;
   computing or receiving a plurality of different priority ranges spanning potential values of the second integer identified, one priority range in the plurality of different priority ranges for each priority level in the plurality, each priority range in the plurality comprising a different number of potential values of the second integer from other priority ranges;
   identifying one of the plurality of different priority ranges into which the second integer falls; and
   selecting the work request from the list from the selected first plurality of lists or second plurality of lists for the priority level corresponding to the identified priority range.

4. The method of claim 3, wherein, one of the plurality of priority ranges for a higher priority level has more of the potential values of the second integer than a different one of the priority ranges for a lower priority level.

5. The method of claim 3, wherein the selecting the work request from the list from the selected first plurality of lists or second plurality of lists for the priority level corresponding to the identified priority range comprises:
   identifying a third integer;
   converting the third integer into a selection integer having a set of possible values corresponding to a number of work requests on the list selected from the selected first plurality of lists or second plurality of lists for the priority level corresponding to the identified priority range; and
   selecting the work request from the list selected from the selected first plurality of lists or second plurality of lists for the priority level corresponding to the identified priority range responsive to the selection integer.

6. The method of claim 5, wherein the converting is performed using a modulus or modulo function.

7. A system for identifying a work request to process, comprising:
   a timetable receipt manager having an input for receiving a first plurality of lists of at least one first work request for performance by a worker in a plurality of workers, each list in the first plurality corresponding to a different priority level in a plurality of priority levels, a second plurality of lists of at least one second work request for performance by more than one of the plurality of workers, each list in the second plurality corresponding to a different priority level in the plurality of priority levels, and a maximum list score identifying a highest of a plurality of total scores among the first plurality of lists for each of the plurality of workers, the total score for each worker in the plurality comprising a sum of list scores for each list in the first plurality for said worker, each list score for a list comprising a first weight corresponding to the priority level for said list, multiplied by a number of the first work requests on said list, the timetable receipt manager for receiving at the timetable receipt manager input or computing, a total multi worker score, the total multi worker score comprising a sum of multi-worker list scores for each list in the second plurality, each multi-worker list score for a list comprising a second weight corresponding to the priority level for said list, multiplied by a number of second work requests on said list, and for providing at an output the first plurality of lists, the second plurality of lists, the maximum list score and the total multi worker score;
   an end of period detector, for identifying an end of a period of time and for providing at an output a signal responsive to the end of the period of time identified;
   an integer producer having an input coupled to the end of period detector output for receiving the signal, the integer producer for, responsive to the signal, identifying a first integer, and providing at an output the first integer;
   a single/multi worker selector having an input coupled to the timetable receipt manager output for receiving the maximum list score and the total multi worker score and coupled to the integer producer output for receiving the first integer, the single/multi worker selector for allocating at least some potential values of the first integer into a first range and a second range, the first range and the second range having a proportion to one another equal to a proportion of the total multi worker score to the maximum list score, each such range not overlapping one another, for determining whether the first integer is in the first range, and responsive to the first integer determined to be in the first range, providing at an output an indicator having a first state, and responsive to the first integer not determined to be in the first range, providing at the single/multi worker selector output the indicator having a second state; and
   an item selector having an input coupled to the single/multi worker selector output for receiving the indicator, and to the timetable receipt manager for receiving at least one selected from a group comprising the first plurality of lists and the second plurality of lists, the item selector for selecting the work request to process from one of the first plurality of lists or the second plurality of lists responsive to the indicator state and for providing the selected work request at an output.

8. The system of claim 7, wherein:
   the item selector input is additionally for receiving the first plurality of lists and the second plurality of lists; and
   the item selector selects the work request by checking one of the first plurality of lists and the second plurality of lists responsive to the indicator received, to determine if said one plurality of lists is empty, and responsive to said one plurality of lists determined to be empty, selecting the work request from the first plurality of lists or second plurality of lists not determined to be empty, and unselecting the first plurality of lists or second plurality of lists determined to be empty.

9. The system of claim 7:
   wherein the integer producer is additionally for identifying a second integer, and providing the second integer at the integer producer output;
   additionally comprising a priority selector, having an input coupled to the integer producer output for receiving the second integer, the priority selector either for receiving at the priority selector input or calculating, a plurality of different priority ranges spanning potential values of the second integer identified, one priority range in the plurality for each priority level in the plurality, each priority range comprising a different number of the potential values of the second integer from other priority ranges, and for identifying at an output an identifier of a priority level corresponding to one of the plurality of different priority ranges into which the second integer falls; and wherein:

the item selector input is additionally coupled to the priority selector output for receiving the identifier of the priority level; and the item selector selects the work request from the list for the priority level corresponding to the priority level received at the item selector input from the one of the selected first plurality of lists or the second plurality of lists responsive to the indicator state.

10. The system of claim 9, wherein, one of the different priority ranges for a higher priority level has more potential values of the second integer than another of the different priority ranges for a lower priority level.

11. The system of claim 9, wherein:

the integer producer is additionally for identifying a third integer, and providing the third integer at the integer producer output;

the item selector input is additionally coupled to the integer producer output for receiving the third integer;

the item selector is additionally for converting the third integer into a selection integer having possible values corresponding to a number of work requests on the list for the priority level corresponding to the priority level indicator received at the item selector input from the one of the first plurality of lists or the second plurality of lists responsive to the indicator state; and the item selector selects the work request from the list for the priority level corresponding to the priority level indicator received at the item selector input from the one of the first plurality of lists or the second plurality of lists responsive to the indicator state, and responsive to the selection integer.

12. The system of claim 11, wherein the item selector performs the converting using a modulus or modulo function.

13. A computer program product comprising a nontransitory computer useable medium having computer readable program code embodied therein for identifying a work request to process, and configured to cause a computer system to:

receive a first plurality of lists of at least one first work request for performance by a worker in a plurality of workers, each worker in the plurality comprising at least a portion of a computer system, each list in the first plurality corresponding to a different priority level in a plurality of priority levels;

receive a second plurality of lists of at least one second work request for performance by more than one of the plurality of workers, each list in the second plurality corresponding to a different priority level in the plurality of priority levels;

receive or compute a maximum list score identifying a highest of a plurality of total scores among the first plurality of lists for each of the plurality of workers, the total score for each worker in the plurality comprising a sum of list scores for each list in the first plurality for said worker, each list score for a list comprising a first weight corresponding to the priority level for said list, multiplied by a number of forst work requests on said list;

receive or compute, a total multi worker score, the total multi worker score comprising a sum of multi-worker list scores for each list in the second plurality, each multi-worker list score for a list comprising a second weight corresponding to the priority level for said list, multiplied by a number of second work requests on said list;

identify an end of a period of time;

responsive to the end of the period of time:

receive or compute a first range and a second range, the first range and the second rage having a proportion to one another equal to a proportion of the total multi worker score to the maximum list score, each range not overlapping one another;

identify a first integer, the first integer having potential values that at least span the first range and the second range;

determine whether the first integer is in the first range;

responsive to the first integer determined to be in the first range, select the first plurality of lists, and responsive to the first integer not determined to be in the first range, select the second plurality of lists; and select the work request responsive to the selected first plurality of lists or second plurality of lists.

14. The computer program product of claim 13, additionally comprising computer readable program code devices configured to cause the computer system to:

check the selected first plurality of lists or second plurality of lists responsive to the first integer to determine if said selected plurality of lists is empty; and responsive to said plurality of lists determined to be empty:

select the first plurality of lists or the second plurality of lists not selected; and unselect the plurality of first plurality of lists or second plurality of lists that are empty.

15. The computer program product of claim 13, wherein the computer readable program code devices configured to cause the computer system to select the work request from the selected first plurality of lists or second plurality of lists comprise computer readable program code devices configured to cause the computer system to:

identify a second integer;

compute or receive a plurality of different priority ranges spanning potential values of the second integer identified, one priority range in the plurality of different priority ranges for each priority level in the plurality, each priority range in the plurality comprising a different number of potential values of the second integer from other priority ranges;

identify one of the plurality of different priority ranges into which the second integer falls; and select the work request from the list from the selected first plurality of lists or second plurality of lists for the priority level corresponding to the identified priority range.

16. The computer program product of claim 15, wherein, one of the plurality of priority ranges for a higher priority level has more potential values of the second integer than a different one of the plurality of priority ranges for a lower priority level.

17. The computer program product of claim 15, wherein the computer readable program code devices configured to cause the computer system to select the work request from the list from the selected first plurality of lists or second plurality of lists for the priority level corresponding to the identified priority range comprise computer readable program code devices configured to cause the computer system to:

identify a third integer;

converting the third integer into a selection integer having a set of possible values corresponding to a number of work requests on the list selected from the selected first plurality of lists or second plurality of lists for the priority level corresponding to the identified priority range; and select the work request from the list selected from the selected first plurality of lists or second plurality fo lists for the priority level corresponding to the identified priority range responsive to the selection integer.

18. The computer program product of claim 17, wherein the computer readable program code devices configured to cause the computer system to convert use a modulus or modulo function.

\* \* \* \* \*